US012625685B2

(12) United States Patent 
Jo et al.

(10) Patent No.: US 12,625,685 B2 
(45) Date of Patent: May 12, 2026

(54) METHOD AND SYSTEM FOR COMPILING APPLICATIONS

(71) Applicant: MOREH CORP., Seoul (KR)

(72) Inventors: Gangwon Jo, Seoul (KR); Jungho Park, Seoul (KR)

(73) Assignee: MOREH CORP., Seoul (KR)

( * ) Notice: Subject to any disclaimer, the term of this patent is extended or adjusted under 35 U.S.C. 154(b) by 253 days.

(21) Appl. No.: 18/595,962

(22) Filed: Mar. 5, 2024

(65) Prior Publication Data

US 2024/0303051 A1    Sep. 12, 2024

(30) Foreign Application Priority Data

Mar. 6, 2023    (KR) ........................ 10-2023-0029483 
Nov. 8, 2023    (KR) ........................ 10-2023-0153950

(51) Int. Cl.
| | |
|---|---|
| *G06F 9/45* | (2006.01) |
| *G06F 8/41* | (2018.01) |
| *G06F 8/52* | (2018.01) |
| *G06F 9/445* | (2018.01) |
| *G06F 21/12* | (2013.01) |
| *G06F 21/14* | (2013.01) |

(52) U.S. Cl.
CPC ...................................... *G06F 8/41* (2013.01)

(58) Field of Classification Search
CPC ..... G06F 8/41; G06F 8/45; G06F 8/54; G06F 8/4441; G06F 9/4552; G06F 11/3698; G06F 8/75; G06F 21/577; G06F 8/443; G06F 8/4432; G06F 30/30; G06F 8/433 
See application file for complete search history.

(56) References Cited

U.S. PATENT DOCUMENTS

| | | | |
|---|---|---|---|
| 8,341,613 B2 * | 12/2012 | Donohue | ................ G06F 8/443 |
| | | | 717/151 |
| 9,027,007 B2 * | 5/2015 | Brackman | ............... G06F 8/443 |
| | | | 717/148 |

FOREIGN PATENT DOCUMENTS

| | | |
|---|---|---|
| JP | 2019-200736 A | 11/2019 |
| JP | 2020-518881 A | 6/2020 |
| JP | 2021-501949 A | 1/2021 |
| KR | 102367196 B1 | 2/2022 |
| WO | 2018-197695 A1 | 11/2018 |
| WO | 2019-089918 A1 | 5/2019 |

* cited by examiner

*Primary Examiner* — Thuy Dao 
(74) *Attorney, Agent, or Firm* — Banner & Witcoff, Ltd.

(57) ABSTRACT

A method for compiling an application is executed by one or more processors, and includes acquiring profiling information of a system on which an application is to be executed, generating a cost model based on the profiling information, acquiring an intermediate representation of at least a portion of the application, applying compiler passes to the intermediate representation and generating a compiled graph, and using the cost model, determining an expected execution time for the compiled graph.

9 Claims, 9 Drawing Sheets

310 ⟶ INTERMEDIATE REPRESENTATION

320 ⟶ COMPILER PASSES

330 ⟶ FIRST COMPILED GRAPH    SECOND COMPILED GRAPH    THIRD COMPILED GRAPH

340 ⟶ COST MODEL

350 ⟶ EXPECTED EXECUTION TIME

360 ⟶ FIRST COMPILED GRAPH

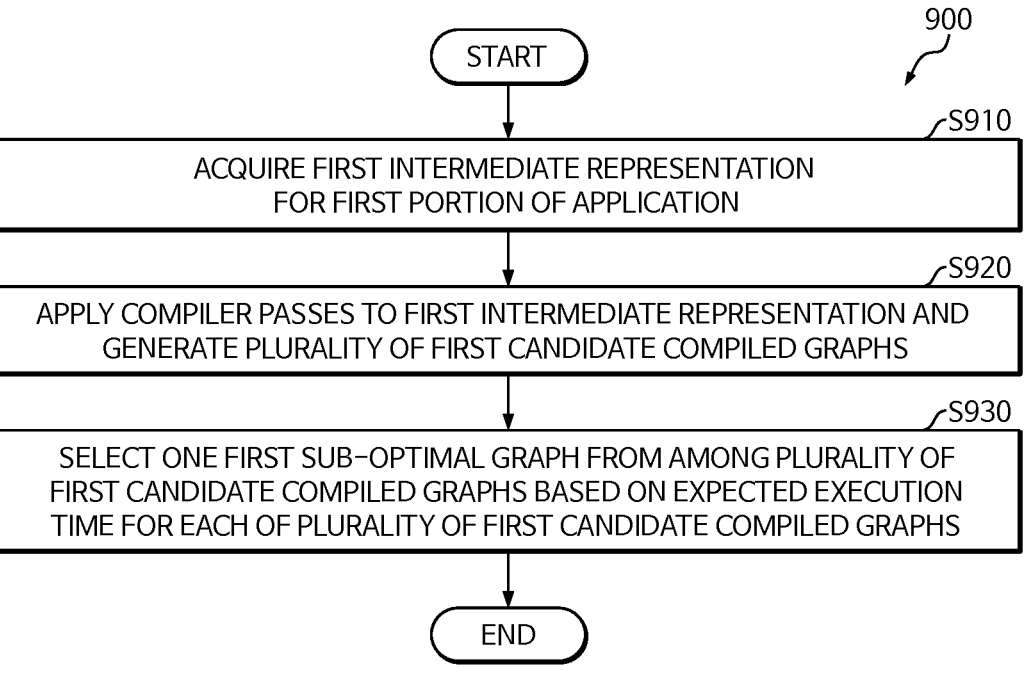

900

START

S910

ACQUIRE FIRST INTERMEDIATE REPRESENTATION
FOR FIRST PORTION OF APPLICATION

S920

APPLY COMPILER PASSES TO FIRST INTERMEDIATE REPRESENTATION AND
GENERATE PLURALITY OF FIRST CANDIDATE COMPILED GRAPHS

S930

SELECT ONE FIRST SUB-OPTIMAL GRAPH FROM AMONG PLURALITY OF
FIRST CANDIDATE COMPILED GRAPHS BASED ON EXPECTED EXECUTION
TIME FOR EACH OF PLURALITY OF FIRST CANDIDATE COMPILED GRAPHS

END

FIG. 9

METHOD AND SYSTEM FOR COMPILING APPLICATIONS

CROSS-REFERENCE TO RELATED APPLICATIONS

This application claims priority to Korean Patent Application No. 10-2023-0029483, filed in the Korean Intellectual Property Office on Mar. 6, 2023, and Korean Patent Application No. 10-2023-0153950, filed in the Korean Intellectual Property Office on Nov. 8, 2023, the entire contents of which are hereby incorporated by reference.

TECHNICAL FIELD

The disclosure relates to a method and system for compiling an application, and specifically, to a method and system for compiling an application to save resources such as execution time of the application.

SUMMARY

The present disclosure provides a method for, a non-transitory computer readable recording medium storing instructions for, and an apparatus (system) for compiling an application to save resources such as execution time of the application.

The present disclosure may be implemented in a variety of ways, including a method, an apparatus (system), or a non-transitory computer-readable recording medium storing instructions.

A method for compiling an application may be performed by at least one first processor and may include acquiring a first intermediate representation for a first portion of the application, applying compiler passes to the first intermediate representation and generating a plurality of first candidate compiled graphs, and based on an expected execution time for each of the plurality of first candidate compiled graphs, selecting one first sub-optimal graph from among the plurality of first candidate compiled graphs.

The method may further include transmitting the first sub-optimal graph to a second processor, and the first sub-optimal graph may be executed by the second processor.

The method may further include acquiring a second intermediate representation for a second portion of the application, in which the second intermediate representation may be the same as the first intermediate representation, applying the compiler passes to the second intermediate representation and generating a plurality of second candidate compiled graphs, in which the plurality of second candidate compiled graphs may be different from the plurality of first candidate compiled graphs, and based on the expected execution time for the first sub-optimal graph and an expected execution time for each of the plurality of second candidate compiled graphs, selecting one second sub-optimal graph from among the first sub-optimal graph or the plurality of second candidate compiled graphs.

The generating the plurality of first candidate compiled graphs may include applying the compiler passes to the first intermediate representation and generating the first candidate compiled graphs as many as a predetermined number, and the generating the plurality of second candidate compiled graphs may include applying the compiler passes to the second intermediate representation and generating the second candidate compiled graphs as many as the predetermined number.

The generating the plurality of first candidate compiled graphs may include generating the plurality of first candidate compiled graphs using a predetermined number of first combinations of compiler options, the generating the plurality of second candidate compiled graphs may include generating the plurality of second candidate compiled graphs using the predetermined number of second combinations of compiler options, and the first combination of the compiler options is different from the second combination of the compiler options.

The method may further include transmitting the first sub-optimal graph to the second processor, and the first sub-optimal graph may be executed by the second processor.

The selecting the one first sub-optimal graph may include, using a cost model, determining an expected execution time for each of the plurality of first candidate compiled graphs.

The generating the plurality of first candidate compiled graphs may include generating the plurality of first candidate compiled graphs by using a combination of a plurality of compiler options.

There is provided a non-transitory computer-readable recording medium storing instructions for executing the method on a computer.

An information processing system is provided, which may include a memory, and at least one processor connected to the memory and configured to execute at least one computer-readable program included in the memory, in which the one or more programs may include instructions for acquiring a first intermediate representation for a first portion of the application, applying compiler passes to the first intermediate representation and generating a plurality of first candidate compiled graphs, and based on an expected execution time for each of the plurality of first candidate compiled graphs, selecting one first sub-optimal graph from among the plurality of first candidate compiled graphs.

BRIEF DESCRIPTION OF THE DRAWINGS

The above and other objects, features and advantages of the present disclosure will be described with reference to the accompanying drawings described below, where similar reference numerals indicate similar elements, but not limited thereto, in which:

FIG. 9 is a flowchart provided to explain an example of a method for compiling an application.

DETAILED DESCRIPTION

Figure 1:
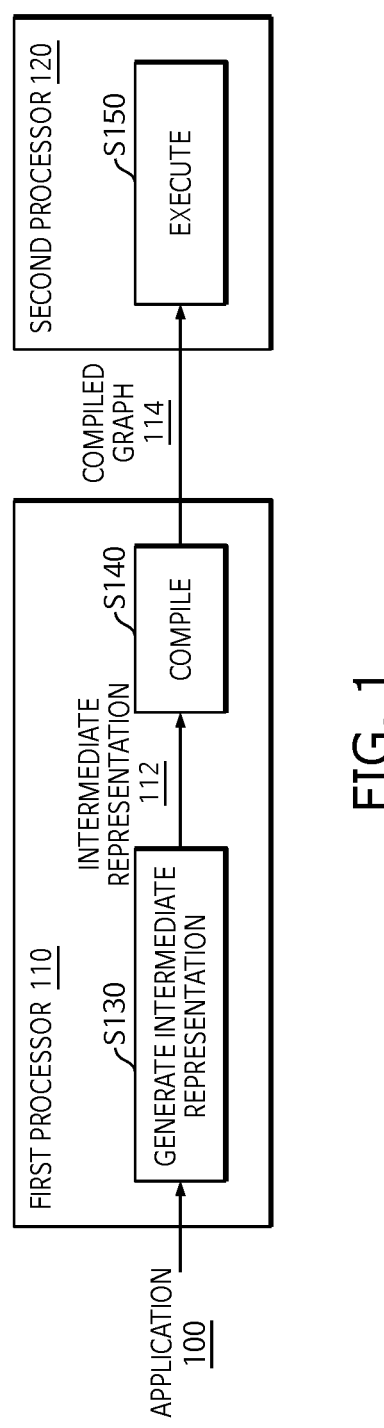
FIG. 1 illustrates an example of a method for compiling an application.

Hereinafter, example details for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components are not included in any example.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains.

The terms used herein will be briefly described prior to describing the disclosed example(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the example(s). Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it is intended as meaning that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to play one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

The "module" or "unit" may be implemented as a processor and a memory. The "processor" should be interpreted broadly to encompass a general-purpose processor, a Central Processing Unit (CPU), a microprocessor, a Digital Signal Processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory integrated with the processor is in electronic communication with the processor.

In the present disclosure, a "system" may refer to at least one of a server apparatus and a cloud apparatus, but is not limited thereto. For example, the system may include one or more server apparatus. In another example, the system may include one or more cloud apparatus. In still another example, the system may include both the server apparatus and the cloud apparatus operated in conjunction with each other.

In the present disclosure, "each of a plurality of A" may refer to each of all components included in the plurality of A, or may refer to each of some of the components included in a plurality of A.

In the present disclosure, an "intermediate representation" may refer to a graph that is generated to efficiently execute a program and has the same meaning as a program and/or information associated therewith. The intermediate representation may include one or more nodes and/or one or more edges.

In some examples of the present disclosure, "generating an intermediate representation" may include storing or updating information associated with the intermediate representation in a memory of an information processing system, etc.

FIG. 1 illustrates an example of a method for compiling an application 100. The application 100 may be compiled and executed by one or more processors. The application 100 may refer to any application including data and operations, and for example, may include a deep learning application. In addition, the data may be implemented in any data type that can configure the application 100, and for example, may include tensor type type data, etc.

The application 100 may be compiled by a first processor 110 and executed by a second processor 120. The first processor 110 may generally be a host processor (e.g., CPU) suitable for overall system operation, data pre-processing, data flow coordination, etc., and the second processor 120 may be a processor (e.g., GPU) suitable for big data processing, parallel processing, matrix multiplication, convolution operations, etc., although examples are not limited thereto. Each of the first processor 110 and the second processor 120 is shown as one processor, but this is merely for convenience of explanation, and each of the first processor 110 and the second processor 120 may include one or more processors.

For example, the application 100 may be compiled by the first processor 110 and executed by the second processor 120, through the process described below.

First, the first processor 110 may acquire an intermediate representation 112 of a first portion of the application 100. For example, the first processor 110 may generate an intermediate representation (IR). As a specific example, the first processor 110 may extract information from the application 100 and generate the intermediate representation 112 having the same semantics as the first portion of the application 100, at S130. The intermediate representation 112 may be represented in the form of a graph including nodes and edges. For example, the data and operations included in the application 100 may be represented by the nodes, and input/output relationships between the data and the operations may be represented by the edges.

According to an example, the first processor 110 may compile the generated intermediate representation 112, at S140. The compiling may include optimization and/or parallelization.

When forming the intermediate representation 112 for the application 100, by applying optimization and/or parallelization to the intermediate representation 112 and executing it instead of executing the instructions of the application 100 in order, execution time or memory usage can be reduced while maintaining the execution result.

The first processor 110 may generate a plurality of candidate compiled graphs from the intermediate representation 112 using various compilation methods (e.g., various optimization techniques and/or parallelization methods, etc.). In addition, the first processor 110 may determine an expected execution time for each of the plurality of candidate compiled graphs and select one compiled graph 114 from the plurality of candidate compiled graphs based on the determined expected execution time. This will be described below in more detail with reference to FIG. 3.

The first processor 110 may provide the selected compiled graph 114 to the second processor 120. In addition, the second processor 120 may execute the compiled graph 114, at S150.

While the second processor 120 is executing the compiled graph 114, the first processor 110 may generate (S130) the intermediate representation 112 for the part of the application 100 for which the intermediate representation 112 is not generated, compile (S140) the generated intermediate representation, and provide the compiled intermediate representation to the second processor 120. The compiled graph 114 provided to the second processor may be executed by the second processor 120 when the second processor 120 is available, at S150. The process may be repeatedly performed.

Figure 2:
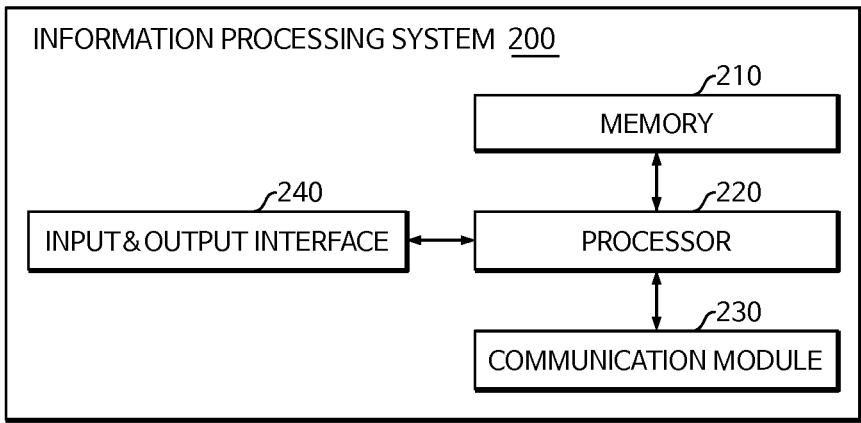
FIG. 2 is a block diagram illustrating an internal configuration of an information processing system.

FIG. 2 is a block diagram illustrating an internal configuration of an information processing system 200. The information processing system 200 may include a memory 210, a processor 220, a communication module 230, and an input and output interface 240. As illustrated in FIG. 2, the information processing system 200 may be configured to communicate information and/or data through a network by using the communication module 230.

The memory 210 may include any non-transitory computer-readable recording medium. The memory 210 may include a permanent mass storage device such as random access memory (RAM), read only memory (ROM), disk drive, solid state drive (SSD), flash memory, etc. In another example, a non-destructive mass storage device such as ROM, SSD, flash memory, disk drive, etc. may be included in the information processing system 200 as a separate permanent storage device that is distinct from the memory. In addition, the memory 210 may store an operating system and at least one program code (e.g., code installed and running in the information processing system 200, for generating a cost model, generating an intermediate representation, generating a compiled graph, determining an expected execution time, selecting a sub-optimal graph, etc.)

These software components may be loaded from a computer-readable recording medium separate from the memory 210. Such a separate computer-readable recording medium may include a recording medium directly connectable to the information processing system 200, and may include a computer-readable recording medium such as a floppy drive, a disk, a tape, a DVD/CD-ROM drive, a memory card, etc., for example. In another example, the software components may be loaded into the memory 210 through the communication module 230 rather than the computer-readable recording medium. For example, at least one program may be loaded into the memory 210 based on a computer program (e.g., a program for generating cost models, generating intermediate representations, generating compiled graphs, determining expected execution times, selecting sub-optimal graphs, etc.) installed by files provided through the communication module 230 by developers or a file distribution system that distributes application installation files.

The processor 220 may be configured to process the commands of the computer program by performing basic arithmetic, logic, and input and output operations. The commands may be provided to a user terminal (not illustrated) or another external system by the memory 210 or the communication module 230.

The communication module 230 may provide a configuration or function for the user terminal (not illustrated) and the information processing system 200 to communicate with each other through a network, and may provide a configuration or function for the information processing system 200 to communicate with an external system (e.g., a separate cloud system). For example, control signals, commands, data, and the like provided under the control of the processor 220 of the information processing system 200 may be transmitted to the user terminal and/or the external system through the communication module 230 and the network through the communication module of the user terminal and/or an external system.

In addition, the input and output interface 240 of the information processing system 200 may be a means for interfacing with an apparatus (not illustrated) for inputting or outputting, which may be connected to, or included in the information processing system 200. In FIG. 2, the input and output interface 240 is illustrated as a component configured separately from the processor 220, but aspects are not limited thereto, and the input and output interface 240 may be configured to be included in the processor 220. The information processing system 200 may include more components than those illustrated in FIG. 2. Meanwhile, most of the related components may not necessarily require exact illustration.

The processor 220 of the information processing system 200 may be configured to manage, process, and/or store the information and/or data received from a plurality of user terminals and/or a plurality of external systems. The first processor may acquire profiling information of a system on which the application is to be executed, and generate a cost model based on the profiling information. In addition, the first processor may acquire an intermediate representation for at least a portion of the application and apply compiler passes to the intermediate representation to generate compiled graphs. For example, the first processor may generate a plurality of candidate compiled graphs for the intermediate representation. The first processor may use the cost model to determine an expected execution time for the compiled graph. For example, the first processor may determine an expected execution time for each of a plurality of candidate compiled graphs. Additionally, the first processor may select one compiled graph from among the plurality of candidate compiled graphs based on the expected execution time for each of the plurality of candidate compiled graphs and provide the result to the second processor.

Figure 3:
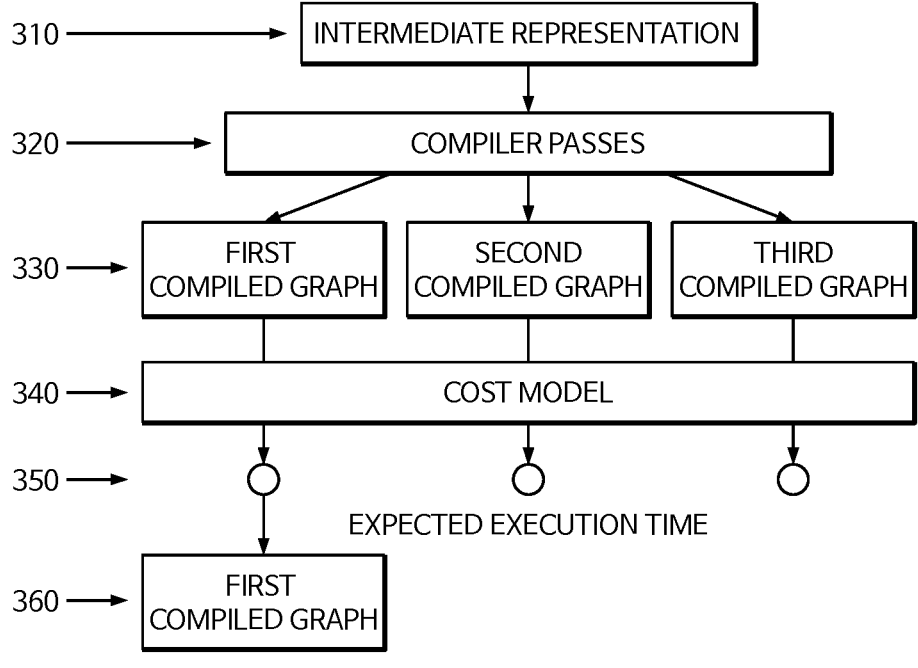
FIG. 3 is a diagram illustrating an example of generating a plurality of compiled graphs from an intermediate representation and selecting one compiled graph.

FIG. 3 is a diagram illustrating an example of generating a plurality of compiled graphs 330 from an intermediate representation 310 and selecting one compiled graph 360. The first processor may acquire the intermediate representation 310 for at least a portion of the application. For example, the first processor may generate the intermediate representation 310 from at least a portion of an application, load the intermediate representation 310 stored in a memory, or receive the intermediate representation 310 from another configuration.

The first processor may apply compiler passes 320 to the intermediate representation 310 to generate the plurality of compiled graphs 330. For example, the first processor may use a plurality of compiler option combinations to generate the plurality of compiled graphs 330 for the intermediate representation 310. A specific example in which the first processor generates the plurality of compiled graphs 330 for the intermediate representation 310 will be described in detail below with reference to FIG. 4.

The first processor may use a cost model 340 to determine an expected execution time 350 for each of the plurality of compiled graphs 330. The cost model 340 may be a model configured to output the expected execution time 350 for the compiled graph 330 based on the compiled graph 330. The cost model 340 may be a model generated based on the profiling information of the information processing system. A specific example in which the first processor generates the cost model 340 will be described in detail below with reference to FIG. 5.

The first processor may select one graph 360 from among the plurality of compiled graphs 330 based on the expected execution time 350 for each of the plurality of compiled graphs 330. For example, the first processor may select the first compiled graph 360 with the shortest expected execution time 350 from among the plurality of compiled graphs 330. The first processor may provide the one selected graph 360 to the second processor, and the second processor may execute the one provided graph 360. Additionally or alternatively, the first processor may transmit the plurality of compiled graphs 330 to the second processor, and the second processor may use the cost model 340 to select one graph 360 with the shortest expected execution time 350. As described above, by determining the expected execution time for various compiled graphs using the cost model and executing the compiled graph with the shortest expected execution time, resources can be saved and the application can be executed efficiently.

Figure 4:
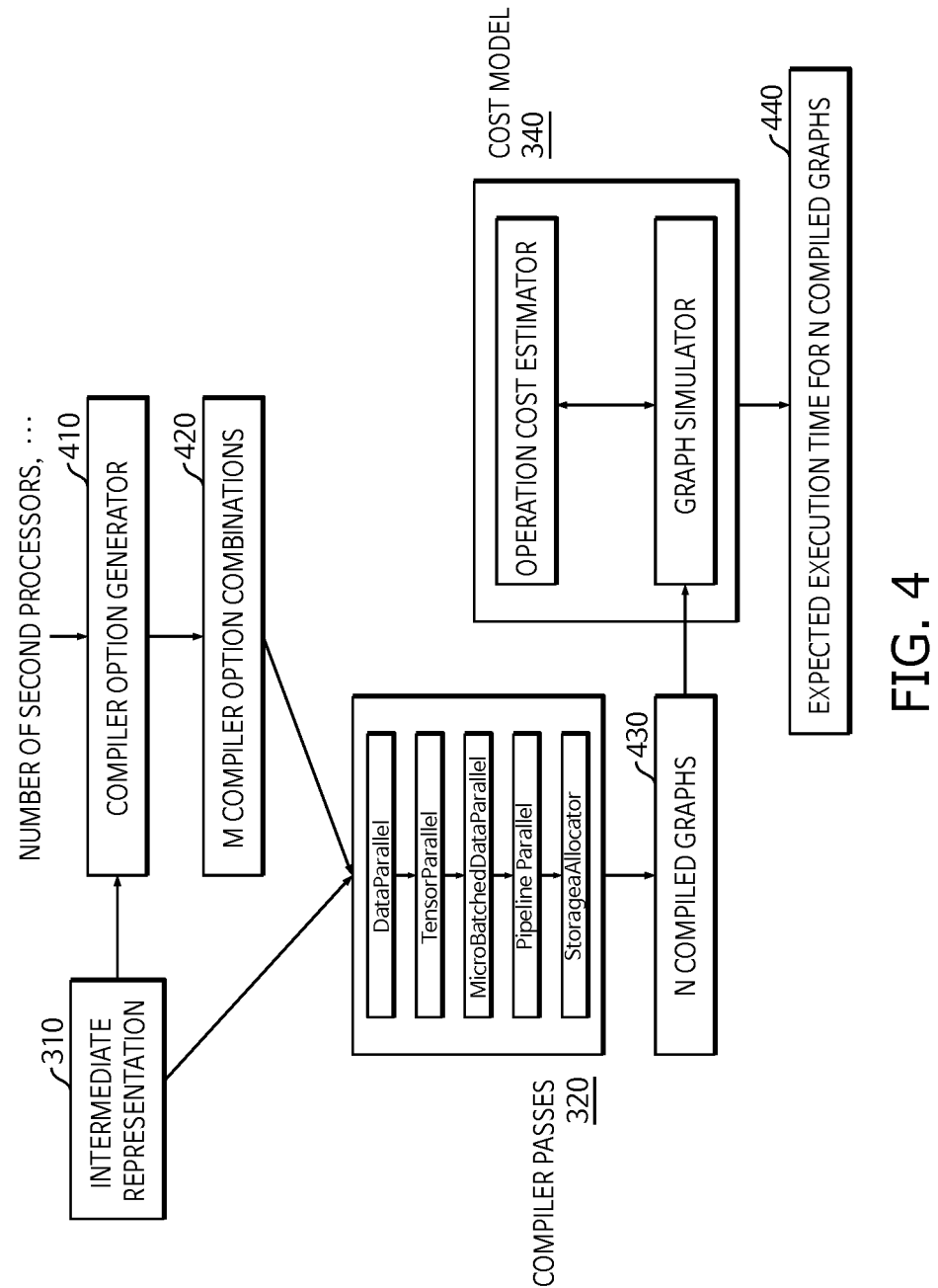
FIG. 4 is a diagram illustrating an example of generating a plurality of compiled graphs for an intermediate representation.

FIG. 4 is a diagram illustrating an example of generating the plurality of compiled graphs 330 for the intermediate representation 310. The first processor may apply the compiler passes 320 to the intermediate representation 310 to generate various compiled graphs 430. FIG. 4 illustrates an example of a process in which various compiled graphs 430 are generated based on one intermediate representation 310.

First, the first processor may use a compiler option generator 410 to generate a plurality of combinations of compiler options 420 based on the number of second processors on which the compiled graph can be executed, the intermediate representation 310, etc. The plurality of combinations of the compiler options 420 may include combinations of the number of batches, a size of a tensor parallel group, the number of pipeline stages, etc., for example.

The first processor may use the generated plurality of compiler option combinations 420 to apply the compiler passes 320 to the intermediate representation 310, thereby generating a plurality of compiled graphs 430 (e.g., N compiled graphs) for the intermediate representation 310. For example, if the compiler passes 320 are applied to the intermediate representation 310 using M compiler option combinations 420, N compiled graphs 430 may be generated, except in cases where compilation is impossible or the same compiled graph is generated.

The first processor may select the options of the compiler option combinations 420 in ascending order from a small value, in descending order from a large value, or randomly selecting the options (e.g., number of batches, size of tensor parallel groups, number of pipeline stages, etc.) to generate the plurality of compiled graphs 430.

In the example illustrated, the compiler passes 320 are illustrated as data parallelization, tensor parallelization, micro-batch data parallelization, pipeline parallelization, and storage allocation in this order, but aspects are not limited thereto, and any compiler passes of various types, orders, or combinations may be applied.

The first processor may use the cost model 340 to determine an expected execution time 440 for each of the plurality of compiled graphs 430. The cost model 340 may be a model configured to output an expected execution time for the compiled graph based on the compiled graph. A specific example in which the first processor generates the cost model 340 will be described in detail below with reference to FIG. 5.

Figure 5:
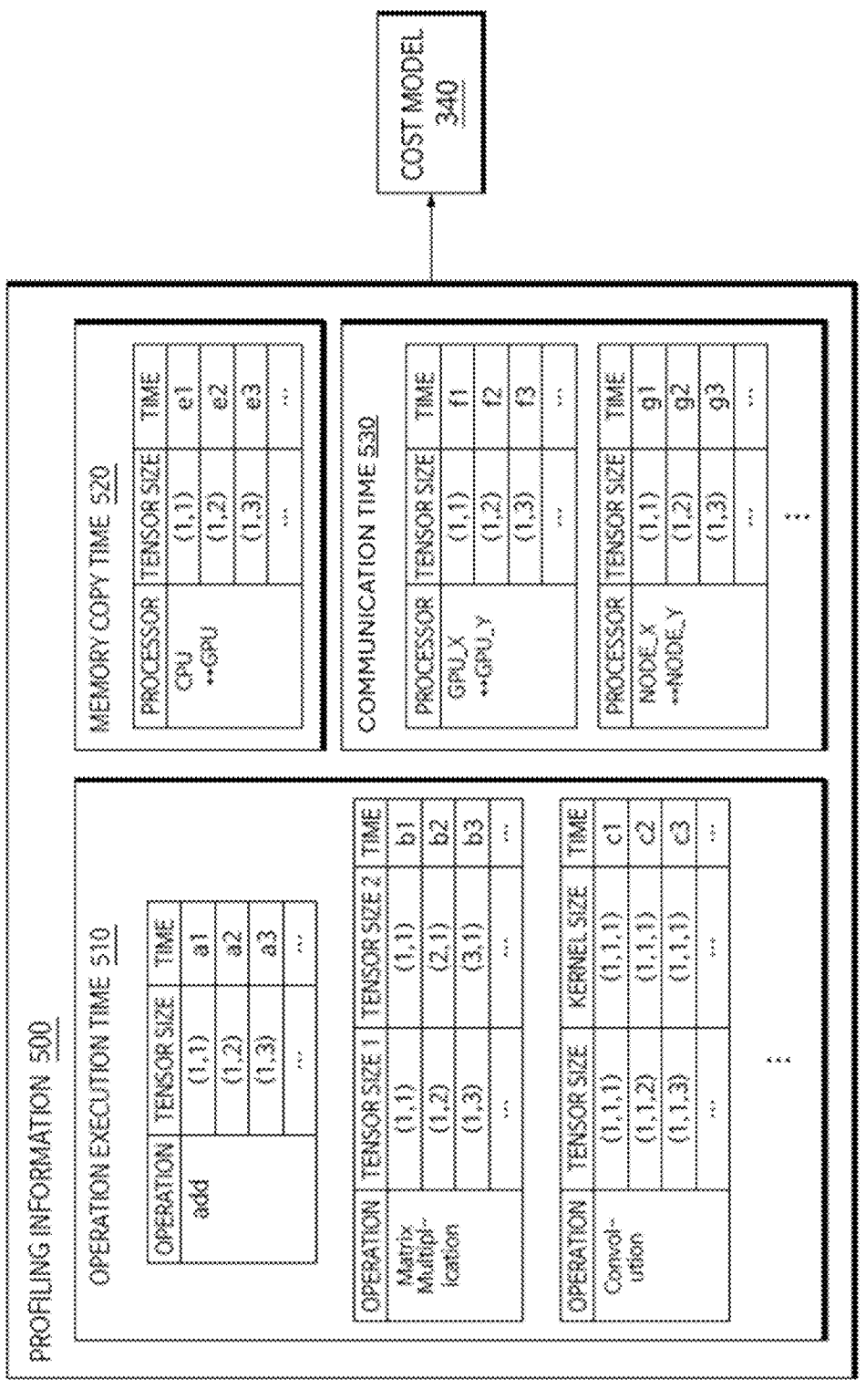
FIG. 5 is a diagram illustrating an example of generating a cost model.

FIG. 5 is a diagram illustrating an example of generating the cost model 340. The first processor may generate the cost model 340 based on profiling information 500 of the system. Acquiring the profiling information 500 of the system and generating the cost model 340 may be performed once for the first time when a computer program for executing the compilation method of the present disclosure is installed in the system. Additionally, if the configuration of at least part of the system is changed, such as a new device is added to the system or an existing device of the system is removed, the acquisition of the profiling information 500 of the system and the generation of the cost model 340 may be re-performed.

The first processor may acquire the profiling information 500 of the system. For example, the first processor may calculate and collect, as the profiling information 500 of the system, an execution time 510 according to a plurality of input data sizes (data layout) for each of a plurality of types of operations. As a specific example, the first processor may calculate a computational operation execution time according to various shapes and sizes of the input tensor for addition (add), a computational operation execution time according to various shapes and sizes of two input tensors for matrix multiplication, a computational operation execution time according to various shapes and sizes of input tensors for convolution, a computational operation execution time according to shape and size of the kernel, etc.

Instead of calculating and collecting the execution time information for all types of operations, the first processor may selectively calculate and collect execution time information for the operations that have a significant impact on performance. For example, the execution time information may be calculated for matrix multiplication, convolution, etc., which are widely used in deep learning applications and require relatively long execution time.

In addition, for the profiling information 500 of the system, the first processor may calculate and collect a memory copy time 520 according to a plurality of data sizes and/or inter-processor or inter-node communication time 530 according to a plurality of data sizes. For example, the first processor may calculate a memory copy time between the first processor (e.g., CPU) and the second processor (e.g., GPU) according to various data sizes, a communication time between the second processors (e.g., GPU_X and GPU_Y) according to various data sizes, a communication time between the second processors (e.g., GPU_X and GPU_Y) according to various data sizes, a communication time between nodes (for example, NODE_X and NODE_Y) according to various data sizes, etc.

The first processor may generate the cost model 340 based on the acquired profiling information 500. The cost model 340 may be configured to receive a compiled graph as input, and output an expected execution time for the input compiled graph. When generating the cost model 340, the first processor may estimate a function that outputs the expected execution time for each of a plurality of types of operations based on the input data size. In this case, the estimated function may be included in the cost model 340.

If generating the cost model 340 is completed, a process of generating and compiling an intermediate representation may be performed, which will be described below with reference to FIGS. 6 and 7.

Figure 6:
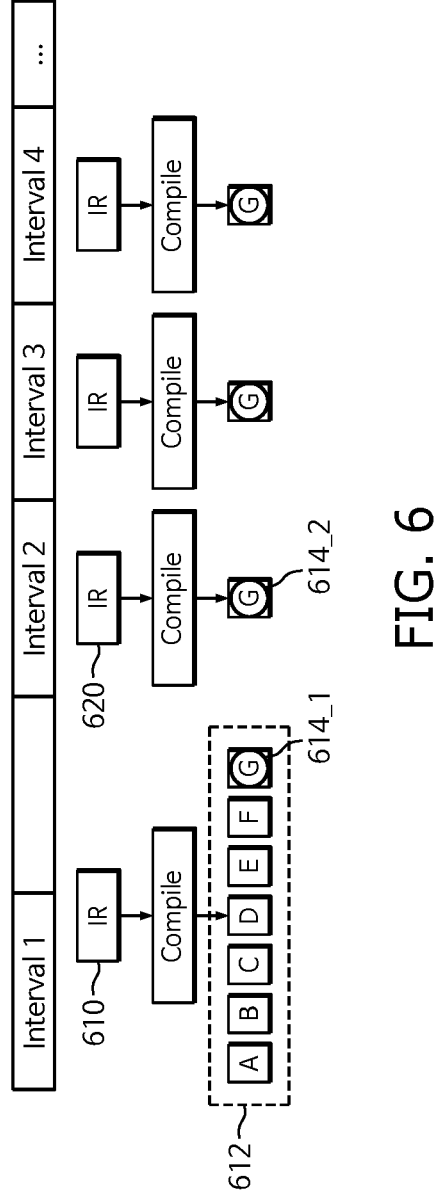
FIG. 6 is a diagram illustrating an example of a method for compiling an application in a plurality of intervals.

FIG. 6 is a diagram illustrating an example of a method for compiling an application in a plurality of intervals. In a first interval, the first processor may generate a first intermediate representation 610 for a first portion of the application. One interval may be determined according to the number of operation nodes included in the first intermediate representation 610. For example, the first processor may initiate generating the first intermediate representation 610 in the first interval, and if the first processor determines that the number of operation nodes included in the first intermediate representation 610 reaches a predetermined interval value (e.g., 1000) while generating the first intermediate representation 610, the first processor may stop generating the first intermediate representation 610. According to another example, a unit of a forward propagation-back-propagation pair may correspond to one interval. The method for determining the interval described above is merely an example, and the intervals may be classified according to various criteria. That is, the method for determining the interval does not limit the scope of the present disclosure.

The first processor may compile the first intermediate representation 610. For example, the first processor may apply the compiler passes to the first intermediate representation 610 to generate a plurality of candidate compiled graphs 612. The first processor may use the cost model to determine the expected execution time for each of the plurality of generated candidate compiled graphs 612. In addition, the first processor may select an optimal compiled graph 614_1 from the plurality of candidate compiled graphs 612 based on the determined expected execution time. As a specific example, the first processor may generate a plurality of candidate compiled graphs A, B, C, D, E, F, and G 612 for the first intermediate representation 610, and select the compiled graph G with the shortest expected execution time as the optimal compiled graph 614_1.

The first processor may provide the optimal compiled graph 614_1 according to the first interval to the second processor. The optimal compiled graph 614 according to the first interval may be executed by the second processor.

The first processor may generate a second intermediate representation 620 for a second portion of the application in a second interval. The second intermediate representation 620 for the second portion may be the same as the first intermediate representation 610 for the first portion. For example, due to the same operation repeating in the application (e.g., the same layer repetition in the deep learning application), the first intermediate representation 610 for the first portion of the first interval and the second intermediate representation 620 for the second portion of the second interval may be the same as each other.

The first processor may provide an optimal compiled graph 614_2 for the second intermediate representation 620 generated in the second interval to the second processor. For example, since the second intermediate representation 620 is the same as the first intermediate representation 610, the first processor may provide the same graph as the optimal compiled graph 614_1 (graph G in the example shown) selected in the first interval to the second processor as the optimal compiled graph 614_2 for the second intermediate representation 620. Since the first processor and the second processor are separate components from each other, the process performed by the first processor and the process performed by the second processor may be performed at the same time. That is, at least a portion of the second interval process performed by the first processor (e.g., generating the second intermediate representation 620 and selecting the optimal compiled graph 614_2 for the second intermediate representation 620) may be performed at the same time as the second processor executes at least a portion of the optimal compiled graph 614 according to the first interval.

The optimal compiled graph 614_2 according to the second interval may be executed by the second processor when the second processor is available (e.g., when execution of the optimal compiled graph 614_1 according to the first interval is completed or when the second processor is provided with the optimal compiled graph 614_2 according to the second interval, whichever is later).

As described above, by determining the expected execution time for each of a plurality of candidate compiled graphs using the cost model, and determining and executing the candidate compiled graph with the shortest expected execution time as the optimal compiled graph, the execution time can be reduced. In addition, if the same intermediate representation is acquired (generated) in the subsequent interval, the optimal compiled graph determined in the previous interval may be executed, thereby reducing the compilation time and execution time. Accordingly, in an application in which the same pattern repeats, the execution performance can be greatly improved.

Figure 7:
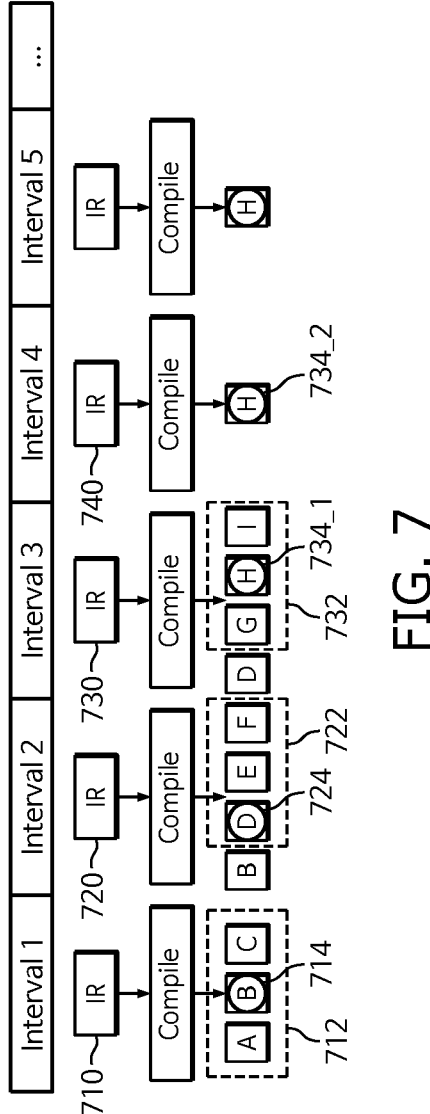
FIG. 7 is a diagram illustrating an example of a method for compiling an application in a plurality of intervals.

FIG. 7 is a diagram illustrating an example of a method for compiling an application in a plurality of intervals. Instead of searching all candidate compiled graphs for a specific intermediate representation in one interval, the first processor may search only a predetermined number of candidate compiled graphs and select and execute a sub-optimal graph of the candidate compiled graphs.

For example, in the first interval, the first processor may generate a first intermediate representation 710 for a first portion of the application. The first processor may generate a predetermined number (e.g., three) of first candidate compiled graphs 712 for the first intermediate representation 710. As a specific example, the first processor may use first combinations of compiler options to generate three first candidate compiled graphs A, B, and C 712 for the first intermediate representation 710.

In addition, using the cost model, the first processor may determine the expected execution time for each of the first candidate compiled graphs 712. The first processor may select a first sub-optimal graph 714 from among the first candidate compiled graphs 712 based on the determined expected execution time. As a specific example, the first processor may select, from among the three first candidate compiled graphs A, B, and C 712, the compiled graph B with the shortest expected execution time as the first sub-optimal graph 714.

The first processor may provide the first sub-optimal graph 714 to the second processor, and the first sub-optimal graph 714 may be executed by the second processor.

The first processor may generate a second intermediate representation 720 for a second portion of the application in a second interval. The second intermediate representation 720 for the second portion may be the same as the first intermediate representation 710 for the first portion. The first processor may generate a predetermined number (e.g., three) of second candidate compiled graphs 722 for the second intermediate representation 720. The second candidate compiled graphs 722 may be different from the first candidate compiled graphs 712. For example, the first processor may generate a predetermined number of second candidate compiled graphs 722 using combinations of compiler options different from the combinations of compiler options used to generate the first candidate compiled graphs 712 in the first interval. That is, the first processor may generate a plurality of second candidate compiled graphs 722 different from the first candidate compiled graphs 712 for the second intermediate representation 720 which is the same as the first intermediate representation 710. As a specific example, the first processor may use second combinations of compiler options to generate the three second candidate compiled graphs D, E, and F 722 for the second intermediate representation 720.

In addition, using the cost model, the first processor may determine the expected execution time for each of the second candidate compiled graphs 722. The first processor may select a second sub-optimal graph 724 from among the first sub-optimal graphs 714 and the second candidate compiled graphs 722 based on the determined expected execution time. As a specific example, the first processor may select, from among the first sub-optimal graph B 714 and the three second candidate compiled graphs D, E, and F 722, the compiled graph D with the shortest expected execution time as the second sub-optimal graph 724.

The first processor may provide the second sub-optimal graph 724 to the second processor. The second sub-optimal graph 724 may be executed by the second processor when the second processor is available (e.g., when execution of the first sub-optimal graph 714 is completed or when the second processor is provided with the second sub-optimal graph 724, whichever is later).

At least some of the second interval processes (e.g., processes such as generating the second intermediate representation 720, generating the second candidate compiled graph 722, determining the expected execution time for the second candidate compiled graph 722, selecting the second sub-optimal graph 724, etc.) performed by the first processor may be performed at the same time as the second processor executes at least a portion of the first sub-optimal graph 714 according to the first interval.

The first processor may repeat the process described above each time the same intermediate representation is acquired. For example, if an intermediate representation that is the same as the first intermediate representation (and as the second intermediate representation) is generated in a certain interval, the first processor may generate candidate compiled graphs different from the candidate compiled graphs generated in the previous interval for the same intermediate representation, and select a graph with the shortest expected execution time from among the candidate compiled graphs generated in the current interval and the sub-optimal graph according to the previous interval as the sub-optimal graph for the current interval. The selected sub-optimal graph may be provided to the second processor.

As a specific example, in a third interval, the first processor may generate a third intermediate representation 730 for a third portion of the application. The third intermediate representation 730 for the third portion may be the same as the first intermediate representation 710 for the first portion and the second intermediate representation 720 for the second portion. The first processor may generate three third candidate compiled graphs G, H, I 732 for the third intermediate representation 730. The third candidate compiled graph 732 may be different from the first candidate compiled graph 712 and the second candidate compiled graph 722. For example, the third candidate compiled graph 732 may be a graph generated using third combinations of compiler options that is different from the first combinations of compiler options and the second combinations of compiler options.

In a specific interval, if the number of searchable candidate compiled graphs for a specific intermediate representation is less than a predetermined number, the first processor may generate only the number of searchable candidate compiled graphs. For example, unlike the example illustrated, if there are only two candidate compiled graphs, G and H, that can be searched in the third interval, that is, if all possible candidate compiled graphs except the graphs G and H were searched for the third intermediate representation 730 up to the second interval, the first processor may generate only the two third candidate compiled graphs G and H.

The first processor may use the cost model to determine the expected execution time for each of the third candidate compiled graphs 732, and select the compiled graph H with the shortest expected execution time from among the third candidate compiled graphs G, H, I 732 and the second sub-optimal graph D 724 as a third sub-optimal graph 734_1.

The first processor may provide the third sub-optimal graph 734_1 to the second processor. The third sub-optimal graph 734_1 may be executed by the second processor when the second processor is available (e.g., when execution of the second sub-optimal graph 724 is completed or when the second processor is provided with the third sub-optimal graph 734_1, whichever is later).

If it is determined that the search for all compiled graphs that can be searched for a specific intermediate representation is complete, the first processor may designate a sub-optimal graph of the previous interval for the specific intermediate representation as the optimal graph, and, in subsequent intervals, may use the optimal graph as the compiled graph for the same intermediate representation.

For example, the first processor may determine that the search for all possible compiled graphs for the third intermediate representation 730 (same as the first intermediate representation 710 and the third intermediate representation 730) from the first interval to the third interval is complete, and designate the third sub-optimal graph H 734_1 as the optimal graph for the third intermediate representation 730. In a fourth interval, the first processor may generate a fourth intermediate representation 740 for a fourth portion of the application. The fourth intermediate representation 740 for the fourth portion may be the same as the first to third intermediate representations 710, 720, and 730. Rather than separately searching the compiled graph for the fourth intermediate representation 740 that is the same as the third intermediate representation 730, the first processor may transmit an optimal graph H 734_2 as the compiled graph for the fourth intermediate representation 740 to the second processor.

In FIG. 7 and the above description, it has been described that a predetermined number of candidate compiled graphs are generated per interval, but aspects are not limited thereto. For example, according to another example, the candidate compiled graphs may be generated using a predetermined number of combinations of compiler options per interval.

In addition, in FIG. 7 and the above description, it has been described that three candidate compiled graphs are searched per interval, but aspects are not limited thereto. If a large number of candidate compiled graphs are searched per interval, it may be possible to find the optimal graph within a small number of intervals, but there may be performance degradation due to searching many candidates until the optimal graph is found. In addition, if a small number of candidate compiled graphs are searched per interval, fast execution is possible in each interval, but it may take many intervals to find the optimal graph. Taking the above into consideration, an appropriate number of candidate compiled graphs may be selected and implemented by design.

As described above, instead of exploring all possible compiled graphs in one interval, by searching only some compiled graphs, and selecting a sub-optimal graph therefrom and executing the same, excessively long compilation time in one interval can be prevented, thereby preventing the second processor from having excessively long idle time. In other words, it is possible to run applications while managing resources efficiently.

Figure 8:
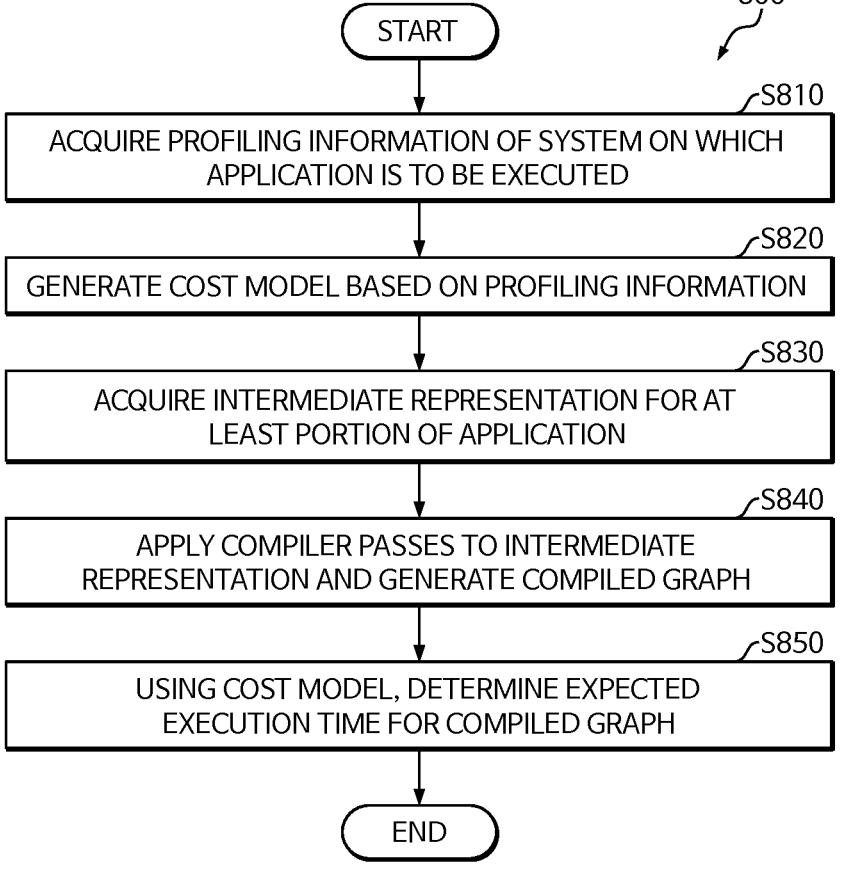
FIG. 8 is a flowchart provided to explain an example of a method for compiling an application.

FIG. 8 is a flowchart provided to explain an example of a method 800 for compiling an application. The method 800 may be initiated by the first processor (at least one processor) acquiring profiling information of a system on which the application is to be executed, at S810. For example, the first processor may calculate an execution time according to a plurality of input data sizes for each of a plurality of types of operations, a memory copy time according to a plurality of data sizes, and/or an inter-processor communication time or an inter-node communication time according to a plurality of data sizes.

The first processor may generate a cost model based on the profiling information, at S820. When generating the cost model, the first processor may estimate a function that outputs an expected execution time based on the input data size for each of a plurality of types of operations based on the profiling information.

Acquiring the profiling information and generating the cost model described above may be performed once for the first time. For example, when a computer program for executing the method 800 (e.g., computer programs for acquiring profiling information and generating cost models, etc.) is installed in the system, acquiring the profiling information and generating the cost model may be performed one time the first time. If the cost model is generated, the following processes may be performed.

The first processor may acquire an intermediate representation for at least a portion of the application, at S830. For example, the first processor may generate an intermediate representation from at least a portion of the application, load an intermediate representation stored in the memory, or receive an intermediate representation from another component.

The first processor may generate a compiled graph by applying compiler passes to the intermediate representation, at S840. The first processor may generate a plurality of compiled graphs for the intermediate representation. For example, the first processor may generate a plurality of combinations of compiler options based on the intermediate representation and the number of the second processors on which the compiled graph can be executed, and may generate a plurality of compiled graphs for the intermediate representation using the generated plurality of combinations of compiler options.

Using the cost model, the first processor may determine the expected execution time for the compiled graph, at S850. When a plurality of compiled graphs are generated for the intermediate representation, the first processor may use the cost model to determine an expected execution time for each of the plurality of compiled graphs. The first processor may select one graph from among the plurality of compiled graphs based on the expected execution time for each of the plurality of compiled graphs. The first processor may transmit the one selected graph to the second processor, and the second processor may execute the one received graph. An example in which the first processor generates a plurality of compiled graphs for the intermediate representation and selects one graph therefrom is described in more detail below with reference to FIG. 9.

FIG. 9 is a flowchart provided to explain an example of a method 900 for compiling an application. The method 900 may initiated by the first processor (at least one processor) acquiring a first intermediate representation for a first portion of an application, at S910. For example, the first processor may generate the first intermediate representation from the first portion of the application, load the first intermediate representation for the first portion stored in the memory, or receive the first intermediate representation for the first portion from another configuration.

The first processor may apply the compiler passes to the acquired first intermediate representation to generate a plurality of first candidate compiled graphs, at S920. The first processor may generate a plurality of first candidate compiled graphs using a plurality of combinations of compiler options. For example, the first processor may use a predetermined number of first combinations of compiler options to generate a plurality of first candidate compiled graphs. As another example, the first processor may generate a predetermined number of first candidate compiled graphs for the first intermediate representation.

The first processor may select one first sub-optimal graph from among the plurality of first candidate compiled graphs based on the expected execution time for each of the plurality of first candidate compiled graphs, at S930. For example, the first processor may use the cost model to determine an expected execution time for each of a plurality of first candidate compiled graphs and select one first sub-optimal graph based on the determined expected execution time. The first processor may transmit the selected first sub-optimal graph to the second processor, and the second processor may execute the received first sub-optimal graph.

The first processor may acquire a second intermediate representation for a second portion of the application and apply the compiler passes to the second intermediate representation to generate a plurality of second candidate compiled graphs. The second intermediate representation may be the same as the first intermediate representation, and the plurality of second candidate compiled graphs may be different from the plurality of first candidate compiled graphs. That is, the first processor may generate a plurality of second candidate compiled graphs that are different from the plurality of first candidate compiled graphs for the second intermediate representation that is the same as the first intermediate representation.

For example, the first processor may use a predetermined number of second combinations of compiler options to generate a plurality of second candidate compiled graphs. The second combinations of compiler options may be different from the first combinations of compiler options used to generate the first candidate compiled graph. As another example, the first processor may generate a predetermined number of second candidate compiled graphs for the second intermediate representation.

Based on the expected execution time for the first sub-optimal graph and the expected execution time for each of the plurality of second candidate compiled graphs, the first processor may select one second sub-optimal graph from among the first sub-optimal graph or a plurality of second candidate compiled graphs. The first processor may transmit the selected second sub-optimal graph to the second processor, and the second processor may execute the received second sub-optimal graph.

At least some of acquiring the second intermediate representation, generating the second candidate compiled graph, selecting the second sub-optimal graph, and transmitting the second sub-optimal graph performed on the first processor may be performed at the same time as the second processor executes the first sub-optimal graph.

The process described above may be repeated each time the same intermediate representation for the application is acquired. That is, each time the same intermediate representation is acquired, the first processor may generate candidate compiled graphs (different from the previous ones) for the intermediate representation, select a sub-optimal graph from among the previous sub-optimal graph and the candidate compiled graphs, and transmit the selected sub-optimal graph to the second processor, and the second processor may execute the received sub-optimal graph.

The flow charts of FIGS. 8 and 9 and the description described above are merely one example of the method, and may be implemented in other ways. For example, according to some examples, one or more steps of operations may be added/deleted/changed, or the order of each step may be changed.

The method described above may be provided as a computer program stored in a computer-readable recording medium for execution on a computer. The medium may be a type of medium that continuously stores a program executable by a computer, or temporarily stores the program for execution or download. In addition, the medium may be a variety of writing means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, etc. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies according to design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, etc. The instructions may be executable by one or more processors, and may cause the processor(s) to perform certain aspects of the functions described in the present disclosure.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or apparatus, and storage may be similarly influenced across a plurality of apparatus. Such apparatus may include PCs, network servers, and portable apparatus.

Although the present disclosure has been described in connection with some examples herein, various modifications and changes can be made without departing from the scope of the present disclosure, which can be understood by those skilled in the art to which the present disclosure pertains. In addition, such modifications and changes should be considered within the scope of the claims appended herein.

The invention claimed is:

1. A method performed by at least one first processor, the method comprising:

acquiring a first intermediate representation for a first portion of an application program;

applying compiler passes to the first intermediate representation;

generating, based on the applying compiler passes to the first intermediate representation, a plurality of first candidate compiled graphs associated with the first intermediate representation;

based on an expected execution time for each of the plurality of first candidate compiled graphs, selecting one first sub-optimal graph from among the plurality of first candidate compiled graphs; and transmitting the first sub-optimal graph to a second processor, wherein the first sub-optimal graph is executed by the second processor.

2. The method according to claim 1, further comprising:

acquiring a second intermediate representation for a second portion of the application program, wherein the second intermediate representation is the same as the first intermediate representation;

applying compiler passes to the second intermediate representation;

generating, based on the applying compiler passes to the second intermediate representation, a plurality of second candidate compiled graphs associated with the second intermediate representation, wherein the plurality of second candidate compiled graphs are different from the plurality of first candidate compiled graphs; and based on the expected execution time for the first sub-optimal graph and an expected execution time for each of the plurality of second candidate compiled graphs, selecting one second sub-optimal graph from among the first sub-optimal graph or the plurality of second candidate compiled graphs.

3. The method according to claim 2, wherein:

a quantity of the generated first candidate compiled graphs corresponds to a predetermined number; and a quantity of the generated second candidate compiled graphs corresponds to the predetermined number.

4. The method according to claim 2, wherein:

the generating the plurality of first candidate compiled graphs comprises generating the plurality of first candidate compiled graphs using a predetermined number of first combinations of compiler options;

the generating the plurality of second candidate compiled graphs comprises generating the plurality of second candidate compiled graphs using a predetermined number of second combinations of compiler options, wherein the predetermined number of first combinations corresponds to the predetermined number of second combinations; and the first combinations of the compiler options is different from the second combinations of the compiler options.

5. The method according to claim 2, further comprising transmitting the second sub-optimal graph to the second processor, wherein the second sub-optimal graph is executed by the second processor.

6. The method according to claim 1, wherein the selecting the one first sub-optimal graph comprises:

using a cost model, determining the expected execution time for each of the plurality of first candidate compiled graphs.

7. The method according to claim 1, wherein the generating the plurality of first candidate compiled graphs comprises:

generating the plurality of first candidate compiled graphs by using a plurality of combinations of compiler options.

8. A non-transitory computer-readable recording medium storing instructions that, when executed by one or more processors, cause performance of the method according to claim 1.

9. An information processing system, comprising:

a memory; and one or more processors coupled to the memory and configured to execute one or more computer-readable programs stored in the memory, wherein the one or more computer-readable programs comprise instructions that, when executed by a first processor of the one or more processors, cause the information processing system to:

acquire a first intermediate representation for a first portion of an application program;

apply compiler passes to the first intermediate representation;

generate, based on applying compiler passes to the first intermediate representation, a plurality of first candidate compiled graphs associated with the first intermediate representation;

based on an expected execution time for each of the plurality of first candidate compiled graphs, select one first sub-optimal graph from among the plurality of first candidate compiled graphs; and transmit the first sub-optimal graph to a second processor on which the first sub-optimal graph is to be executed.

* * * * *